April 1, 1958  C. F. FARMER  2,828,646
COLLAPSIBLE STEERING POST
Filed March 7, 1956  2 Sheets-Sheet 1

Charles F. Farmer
INVENTOR.

BY
Attorneys

April 1, 1958  C. F. FARMER  2,828,646
COLLAPSIBLE STEERING POST
Filed March 7, 1956  2 Sheets-Sheet 2
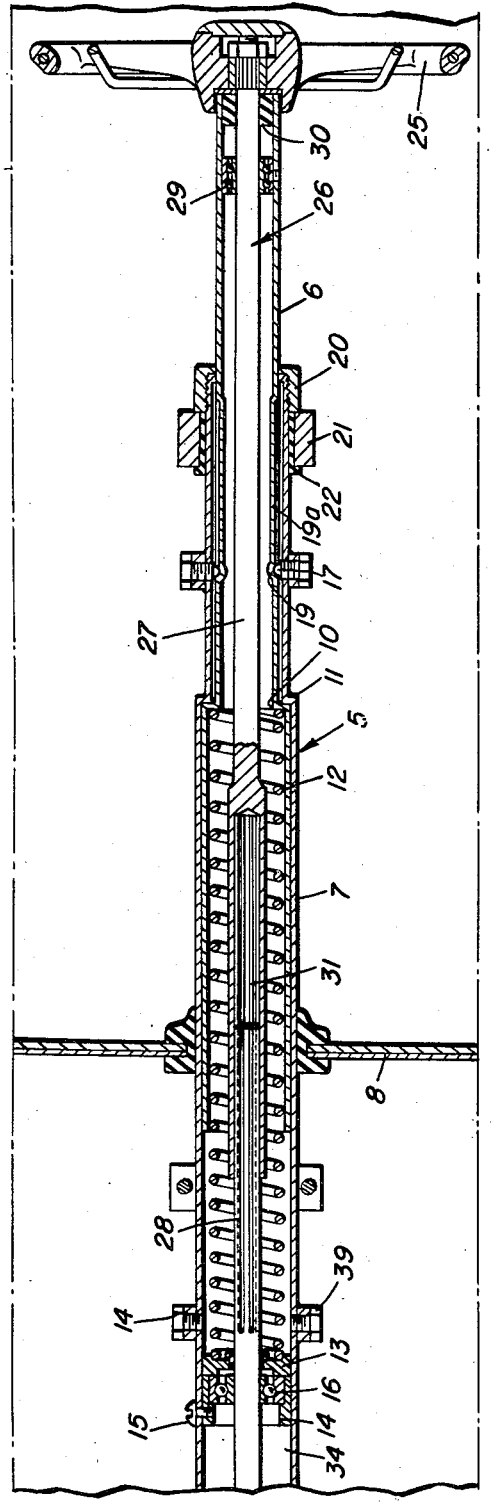
Charles F. Farmer
INVENTOR.
BY Clarence A. O'Brien
and Harvey B. Jacobson
Attorneys

United States Patent Office 2,828,646
Patented Apr. 1, 1958

2,828,646

COLLAPSIBLE STEERING POST

Charles F. Farmer, San Angelo, Tex., assignor of thirty-three and one-third percent to W. E. Hall and thirty-three and one-third percent to Albert J. Haney, Jr., both of San Angelo, Tex.

Application March 7, 1956, Serial No. 570,052

3 Claims. (Cl. 74—493)

The present invention relates to new and useful improvements in steering posts for motor vehicles and more particularly to a collapsible steering post constructed for telescoping movement by predetermined downward pressure subjected to the steering wheel to prevent injury to the driver when thrown against the same during a collision.

An important object of the invention is to slidably mount the steering post in a telescoping housing forming an expansible and contractible pneumatic chamber having a pair of check valves therein to control admission of air into and discharge of air out of the chamber to provide a pneumatic shock absorbing action for the steering post.

Another object is to provide spring means for raising the steering post and spring biased ball catch means to lock the steering post in raised position.

A further object is to provide a collapsible steering post of simple and practical construction, which is efficient, safe and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged vertical sectional view taken on a line 2—2 of Figure 1;

Figure 1:
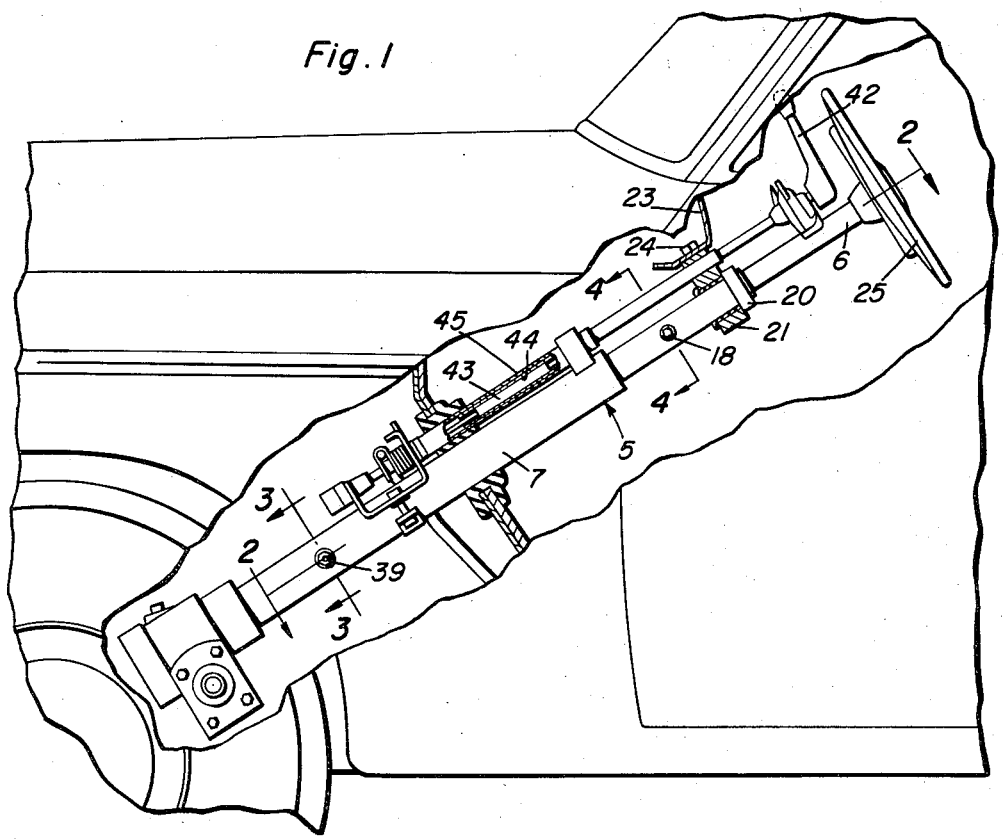
Figure 1 is a side elevational view.
Figure 5:
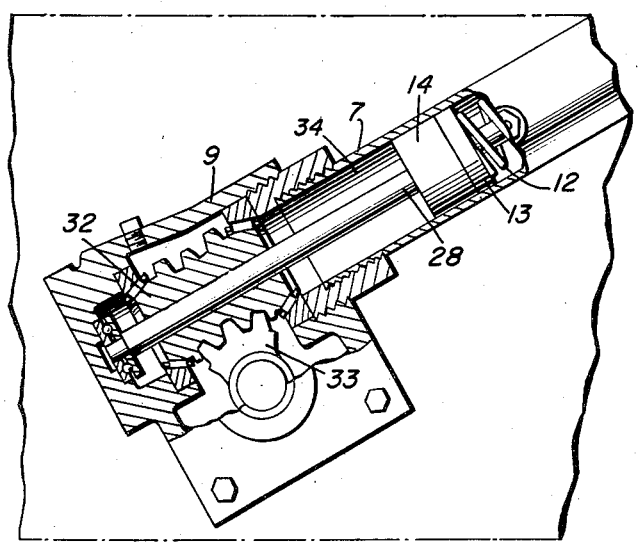

Figures 3 and 4 are enlarged transverse sectional views taken respectively on the lines 3—3 and 4—4 of Figure 1; and Figure 5 is an enlarged fragmentary longitudinal sectional view of the lower end of the steering post and gear box.

Referring now to the drawings in detail, wherein for the purpose of illustration I have disclosed a preferred embodiment of my invention, the numeral 5 designates a steering post housing composed of upper and lower telescoping sections 6 and 7. Lower section 7 is supported in an upwardly inclined position in the floor 8 of a motor vehicle and with the lower end of section 7 secured to a steering gear box 9 of a conventional type.

Upper and lower housing sections 6 and 7 are formed with abutting external and internal shoulders 10 and 11 respectively, and a coil spring 12 is held compressed between shoulder 10 of upper section 6 and a washer 13 in a lower section 7 to raise the upper section. Washer 13 is secured in a fixed position in the lower section by a collar 14 secured therein by a screw 15 and a lower ball bearing assembly 16 is supported in the collar.

The upper section 6 is locked in a raised position by a pair of spring loaded ball catches 17 secured in housings 18 at diametrically opposite sides of lower section 7 and engaged in recesses 19 in the upper section 6. As can be seen in Figure 2, a longitudinal groove 19a is formed in the upper section 6, coextensive with the range of movement of the upper section and leading to the recess 19 in which the catch is slidable so as to guide and attach into the recess. A nut 20 is threaded onto the upper end of lower section 7 to clamp a collar 21 on a flanged bushing 22 mounted on said lower section and collar 21 is secured to the instrument panel 23 of the vehicle by nut 24 to brace the upper portion of the steering housing.

A steering wheel 25 is rotatably supported on the upper end of upper section 6 and the wheel is secured to the upper end of a steering post 26 which is constructed of upper and lower telescoping sections 27 and 28. Upper post section 27 is journaled in an upper ball bearing assembly 29 secured in the upper housing section 6 and the upper post section is also rotatable in a packing washer 30 which seals the top of the upper housing section. The meeting telescoping ends of the upper and lower steering post sections are provided with a sliding splined connection 31 to connect said sections for rotation as a unit by the turning of steering wheel 25.

The lower end of lower steering post section 28 is connected to the usual worm 32 and gear 33 of a conventional-type of steering gear mechanism enclosed in housing 9.

The steering post housing 5 provides a substantially airtight chamber 34 in which air is compressed by a downward movement of steering wheel 25 and upper housing section 6 to function as a pneumatic shock absorber by downward pressure on the steering wheel. A pair of ball check valves 35 and 36 are mounted in housings 37 and 38 at diametrically opposite sides of lower housing section 7 and each housing 37 and 38 is formed with an air port 39. Ball check 35 is an inlet valve to admit air into chamber 34 and is held closed by a coil spring 40, while ball check 36 is an outlet valve for the escape of air from the chamber and is closed by a coil spring 41.

In certain types of motor vehicles equipped with a gear shift lever 42 mounted on the steering column or steering post housing 5, the lever includes a telescoping shaft 43 which is slidable and rotatable in upper and lower telescoping shaft housing sections 44 and 45. The shaft housings 44 and 45 are secured to the respective upper and lower steering post housing sections 6 and 7 for sliding movement therewith. Shaft 43 is constructed similar to the steering post 26, while the sections of the shaft housing are similar in construction and operation to the sections of the steering post housing 5 to function in a similar manner upon a downward movement of the latter and to permit independent actuation of the steering post and gear shift shaft by steering wheel 25 and gear shift lever 42.

Accordingly, should the vehicle be involved in a collision tending to throw the driver forwardly against the steering wheel, the steering post housing will move downwardly in a telescoping movement and the shock absorbing action caused by the compression of air in chamber 34 will reduce the force of the impact subjected to the driver and to reduce the danger of the steering wheel crushing the chest of the driver.

The action of the check valve 36 will permit a gradual escape of air from chamber 34 as the air is compressed therein by a downward movement of upper housing section 6 to control such movement in accordance with the downward pressure subjected to the steering wheel, and check valve 35 will admit return of air into the chamber when the upper housing section 6 is raised by spring 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A collapsible steering column comprising a housing composed of upper and lower telescoping sections, said lower section being fixed, a telescopically constructed steering post rotatably mounted in the housing and having a steering wheel connected to its upper end and with the steering wheel rotatable on top of the upper housing section, spring means in the housing for raising the upper housing section, a spring loaded ball catch internally of the lower section, a recess in the upper section to lockably receive the catch to retain the upper section in a raised position, a longitudinal groove in the upper section coextensive with the range of movement of the latter and leading to the recess and in which the catch is slidable to guide the catch into the recess, said housing forming an air chamber and said spring means opposing collapsing movement of the upper housing section, air inlet and outlet ports in the housing, and check valves for said ports.

2. A collapsible steering column comprising a housing composed of upper and lower telescoping sections, said lower section being fixed, a telescopically constructed steering post rotatably mounted in the housing and having a steering wheel connected to its upper end and with the steering wheel rotatable on top of the upper housing section, spring means in the housing for raising the upper housing section, said housing being sealed at its upper and lower ends to form an air chamber therein and said upper section of the housing forming a plunger working in the lower housing section to provide pneumatic shock absorbing means for the steering wheel, air inlet and outlet ports in the housing, and check valves for said ports.

3. In combination, a collapsible steering column and a collapsible gear shift device, said steering column including a housing composed of upper and lower telescoping housing sections and a telescoping steering post rotatably mounted in the housing, said gear shift device including a housing composed of upper and lower telescoping housing sections secured respectively to the first-named upper and lower housing sections for uniform collapsing movement of the upper housing sections, said gear shift device also including a telescoping shaft rotatably mounted in the gear shift housing and a lever secured to the upper end of the shaft, and shock absorbing means in at least one of the housings to oppose collapsing movement thereof.

References Cited in the file of this patent
UNITED STATES PATENTS

| | | |
|---|---|---|
| 1,367,695 | Gray | Feb. 8, 1921 |
| 1,838,802 | Bischof | Dec. 29, 1931 |
| 2,028,953 | Roark | Jan. 28, 1936 |
| 2,511,165 | Lyman | June 13, 1950 |
| 2,639,626 | Snyder | May 26, 1953 |
| 2,716,355 | Schmid | Aug. 30, 1955 |